(12) United States Patent
Cornwall

(10) Patent No.: US 7,948,396 B2
(45) Date of Patent: May 24, 2011

(54) RF METER READING SYSTEM

(75) Inventor: Mark K. Cornwall, Spokane, WA (US)

(73) Assignee: Itron, Inc., Liberty Lake, WA (US)

( * ) Notice: Subject to any disclaimer, the term of this patent is extended or adjusted under 35 U.S.C. 154(b) by 0 days.

(21) Appl. No.: 12/468,503

(22) Filed: May 19, 2009

(65) Prior Publication Data

US 2009/0224940 A1 Sep. 10, 2009

Related U.S. Application Data

(62) Division of application No. 11/222,657, filed on Sep. 9, 2005, now Pat. No. 7,535,378.

(51) Int. Cl.
*G08B 23/00* (2006.01)

(52) U.S. Cl. ......... 340/870.02; 379/106.03; 379/106.06; 379/106.07; 340/825.69

(58) Field of Classification Search ............. 340/870.03, 340/825.69; 379/106.03, 106.06, 106.07
See application file for complete search history.

(56) References Cited

U.S. PATENT DOCUMENTS

| | | | |
|---|---|---|---|
| 4,315,251 A | 2/1982 | Robinson et al. | |
| 4,396,915 A | 8/1983 | Farnsworth et al. | |
| 4,614,945 A | 9/1986 | Brunius et al. | |
| 5,031,209 A | 7/1991 | Thornborough et al. | |
| 5,184,314 A | 2/1993 | Kelly et al. | |
| 5,194,860 A | 3/1993 | Jones et al. | |
| 5,377,232 A | 12/1994 | Davidov et al. | |
| 5,379,047 A | 1/1995 | Yokev et al. | |
| 5,438,329 A | 8/1995 | Gastouniotis et al. | |
| 5,451,937 A | 9/1995 | Olson et al. | |
| 5,451,938 A | 9/1995 | Brennan, Jr. | |
| 5,495,239 A | 2/1996 | Ouellette | |
| 5,519,388 A | 5/1996 | Adair, Jr. | |
| 5,525,898 A | 6/1996 | Lee, Jr. et al. | |
| 5,530,452 A | 6/1996 | Yokev et al. | |
| 5,546,318 A | 8/1996 | Lee, Jr. | |
| 5,583,517 A | 12/1996 | Yokev et al. | |
| 5,592,180 A | 1/1997 | Yokev et al. | |
| 5,631,636 A | 5/1997 | Bane | |
| 5,684,472 A | 11/1997 | Bane | |
| 5,717,718 A | 2/1998 | Rowsell et al. | |
| 5,719,564 A | 2/1998 | Sears | |
| 5,874,903 A | 2/1999 | Shuey et al. | |

(Continued)

OTHER PUBLICATIONS

Andren, Carl; Bozych, Tim; Rood, Bob; and Schultz, Doug, PRISM Power Management Modes, Feb. 1997, pp. 1-7.

(Continued)

*Primary Examiner* — Travis R Hunnings
(74) *Attorney, Agent, or Firm* — Dority & Manning, P.A.

(57) ABSTRACT

A meter reading system of the present invention enables transmission of data between utility meter endpoints and readers. In a first embodiment, the endpoint provides a short message providing its identification to the reader and immediately enters a listen mode. If the reader hears the short message, it can immediately respond and request additional information from the endpoint. If the reader does not hear the short message or does not request additional information during the endpoints listening period, the endpoint enters a sleep mode until its next transmission time. In another embodiment, the endpoint transmits an SCM via AM communication to the reader. The reader can then request additional information and the endpoint can respond with the information via two-way FM communication. In another embodiment, the endpoint is capable of transmitting interval data to the reader via either AM or FM communication.

13 Claims, 3 Drawing Sheets

U.S. PATENT DOCUMENTS

| | | | |
|---|---|---|---|
| 5,896,097 A | 4/1999 | Cardozo | |
| 5,923,269 A | 7/1999 | Shuey et al. | |
| 5,953,371 A | 9/1999 | Rowsell et al. | |
| 6,006,212 A | 12/1999 | Schleich et al. | |
| 6,014,089 A * | 1/2000 | Tracy et al. | 340/870.02 |
| 6,088,659 A | 7/2000 | Kelley et al. | |
| 6,100,817 A | 8/2000 | Mason, Jr. et al. | |
| 6,150,955 A * | 11/2000 | Tracy et al. | 340/870.02 |
| 6,188,715 B1 | 2/2001 | Partyka | |
| 6,195,018 B1 | 2/2001 | Ragle et al. | |
| 6,246,677 B1 | 6/2001 | Nap et al. | |
| 6,329,928 B1 | 12/2001 | Hershey | |
| 6,369,719 B1 * | 4/2002 | Tracy et al. | 340/870.02 |
| 6,477,386 B1 | 11/2002 | Giles | |
| 6,628,207 B1 | 9/2003 | Hemminger et al. | |
| 6,867,707 B1 | 3/2005 | Kelley et al. | |
| 6,963,285 B2 | 11/2005 | Fischer et al. | |
| 6,967,974 B1 | 11/2005 | Partyka | |
| 6,996,215 B2 | 2/2006 | MacConnell | |
| 7,012,546 B1 | 3/2006 | Zigdon et al. | |
| 7,020,532 B2 | 3/2006 | Johnson et al. | |
| 7,042,368 B2 | 5/2006 | Patterson et al. | |
| 7,065,457 B1 | 6/2006 | Germer et al. | |
| 7,106,044 B1 | 9/2006 | Lee, Jr. et al. | |
| 7,248,181 B2 | 7/2007 | Patterson et al. | |
| 7,283,580 B2 | 10/2007 | Cumeralto et al. | |
| 7,283,916 B2 | 10/2007 | Cahill-O'Brien et al. | |
| 7,336,200 B2 * | 2/2008 | Osterloh et al. | 340/870.02 |
| 7,535,378 B2 * | 5/2009 | Cornwall | 340/870.02 |
| 7,577,181 B2 * | 8/2009 | Cornwall et al. | 375/134 |
| 2002/0063635 A1 | 5/2002 | Shincovich | |
| 2003/0016142 A1 | 1/2003 | Holmes et al. | |
| 2003/0048199 A1 | 3/2003 | Zigdon et al. | |
| 2003/0174067 A1 | 9/2003 | Soliman | |
| 2005/0065743 A1 | 3/2005 | Cummings et al. | |
| 2005/0179561 A1 | 8/2005 | Osterloh et al. | |
| 2005/0237959 A1 | 10/2005 | Osterloh et al. | |
| 2005/0240540 A1 | 10/2005 | Borleske et al. | |
| 2005/0270173 A1 | 12/2005 | Boaz | |
| 2007/0057812 A1 * | 3/2007 | Cornwall | 340/870.02 |
| 2010/0007521 A1 * | 1/2010 | Cornwall | 340/870.02 |

OTHER PUBLICATIONS

PCT International Search Report for PCT International Application No. PCT/US06/35508 mailed Aug. 29, 2007.

* cited by examiner

RF METER READING SYSTEM

PRIORITY CLAIM

This application is a divisional of U.S. patent application Ser. No. 11/222,657 filed Sep. 9, 2005, now U.S. Pat. No. 7,535,378 issued May 19, 2009, which is incorporated herein by reference in its entirety for all purposes.

FIELD OF THE INVENTION

The present invention is directed to automatic utility meter reading systems and, more specifically, is directed to an automatic utility meter reading system wherein the system synchronizes the reader to the endpoints and provides multipoint two-way meter reading.

BACKGROUND OF THE INVENTION

In a radio based meter reading system where there are many endpoints to be read by a single reader and the system needs to carry on two-way communication, the two devices communicating need to be available when data is sent. This is difficult in a system that uses battery powered endpoints where it is desirable to leave the endpoint off as much as possible. If the endpoint is off it cannot be available for communication. As such there is a need for a meter reading system that enables the ability to both obtain meter readings and permit two-way communication between reader and endpoint without significantly diminishing the battery life of battery powered endpoints.

SUMMARY OF THE INVENTION

The needs described above are in large part met by the meter reading system and method of the present invention. The meter reading system generally includes a reader and a utility meter endpoints. An intermediary repeater may also be used. In a first preferred embodiment of the invention, the endpoints bubble up to transmit a short burst transmission of their identification. The endpoint then turns off its transmitter, to save on battery power, and goes into a listen mode for response from the reader. If the endpoint receives a response, in the form of a request for additional information from the reader, the endpoint transmits the requested information. If the endpoint does not receive a response from the reader, the endpoint enters a sleep mode until its next transmit time to, once again, save batter power.

A method of this preferred embodiment includes the steps of: (1) waking up each of the endpoints; (2) transmitting/bubbling up a short burst transmission from each of the endpoints; (3) listening with the endpoint for a response from the reader; (4) listening by the reader for the short burst transmission; (5) upon the reader receiving the short burst transmission, requesting additional information from the endpoint; (6) upon receiving the request for additional information, transmitting the additional information requested from the endpoint; and (7) upon not receiving the request for additional information, entering a sleep mode with said endpoint until a next pre-programmed short burst transmission time.

An alternate preferred embodiment of the invention provides for the endpoint to transmit a standard consumption message (SCM) via AM communication. Immediately, upon transmitting the AM communication, the endpoint transfers into a two-way, FM receive/transmit mode. When the reader receives the SCM, the reader requests additional information from the endpoint and the endpoint transmits that additional information via the two-way FM communication.

A method of the alternate preferred embodiment includes the steps of: (1) transmitting an SCM via AM transmission from the endpoint; (2) switching the endpoint into a two-way FM transmit/receive mode upon completing the AM transmission; (3) receiving the SCM with the reader; and (4) requesting additional information from the endpoint with the reader by two-way FM communication between the reader and endpoint.

In still another alternative embodiment of the present invention, the endpoint operates to save intervals of utility meter data. This interval data is capable of being transmitted by the endpoint in either AM or FM. In this instance, the reader, upon hearing the endpoint, transmits a command to the endpoint to send a predetermined number of intervals over a predetermined communication channel or channels.

DETAILED DESCRIPTION OF THE PREFERRED EMBODIMENTS

The automatic meter reading system of the present invention enables both meter reading and two-way communication between devices while at the same time maintaining battery life of those endpoints within the AMR system that rely strictly on battery power.

In conjunction with the detailed description below, this application hereby incorporates by reference commonly assigned U.S. Provisional Application No. 60/500,507, filed on Sep. 5, 2003, entitled, "SYSTEM AND METHOD FOR DETECTION OF SPECIFIC ON-AIR DATA RATE," U.S. Provisional Application No. 60/500,515, filed Sep. 5, 2003, entitled, "SYSTEM AND METHOD FOR MOBILE DEMAND RESET," U.S. Provisional Application No. 60/500,504, filed Sep. 5, 2003, entitled, "SYSTEM AND METHOD FOR OPTIMIZING CONTIGUOUS CHANNEL OPERATION WITH CELLULAR REUSE," U.S. Provisional Application No. 60/500,479 , filed Sep. 5, 2003, entitled, "SYNCHRONOUS DATA RECOVERY SYSTEM," U.S. Provisional Application No. 60/500,550, filed Sep. 5, 2003, entitled, "DATA COMMUNICATION PROTOCOL IN AN AUTOMATIC METER READING SYSTEM," U.S. patent application Ser. No. 10/655,760. US00), filed on Sep. 5, 2003, entitled, "SYNCHRONIZING AND CONTROLLING SOFTWARE DOWNLOADS, SUCH AS FOR COMPONENTS OF A UTILITY METER-READING SYSTEM," and U.S. patent application Ser. No. 10/655,759, filed on Sep. 5, 2003, entitled, "FIELD DATA COLLECTION AND PROCESSING SYSTEM, SUCH AS FOR ELECTRIC, GAS, AND WATER UTILITY DATA."

Figure 1:
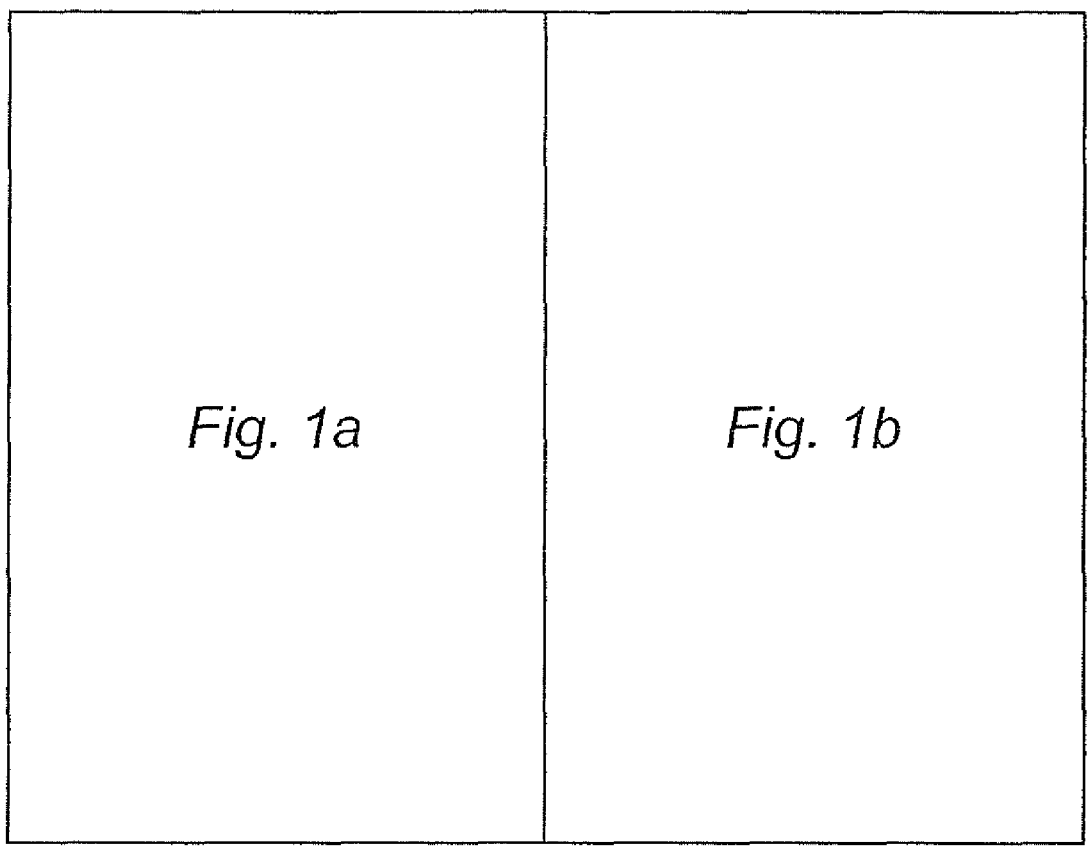
FIG. 1 depicts a radio-based automatic meter reading system that utilizes the data communication protocol of the present invention.
Figure 1A:
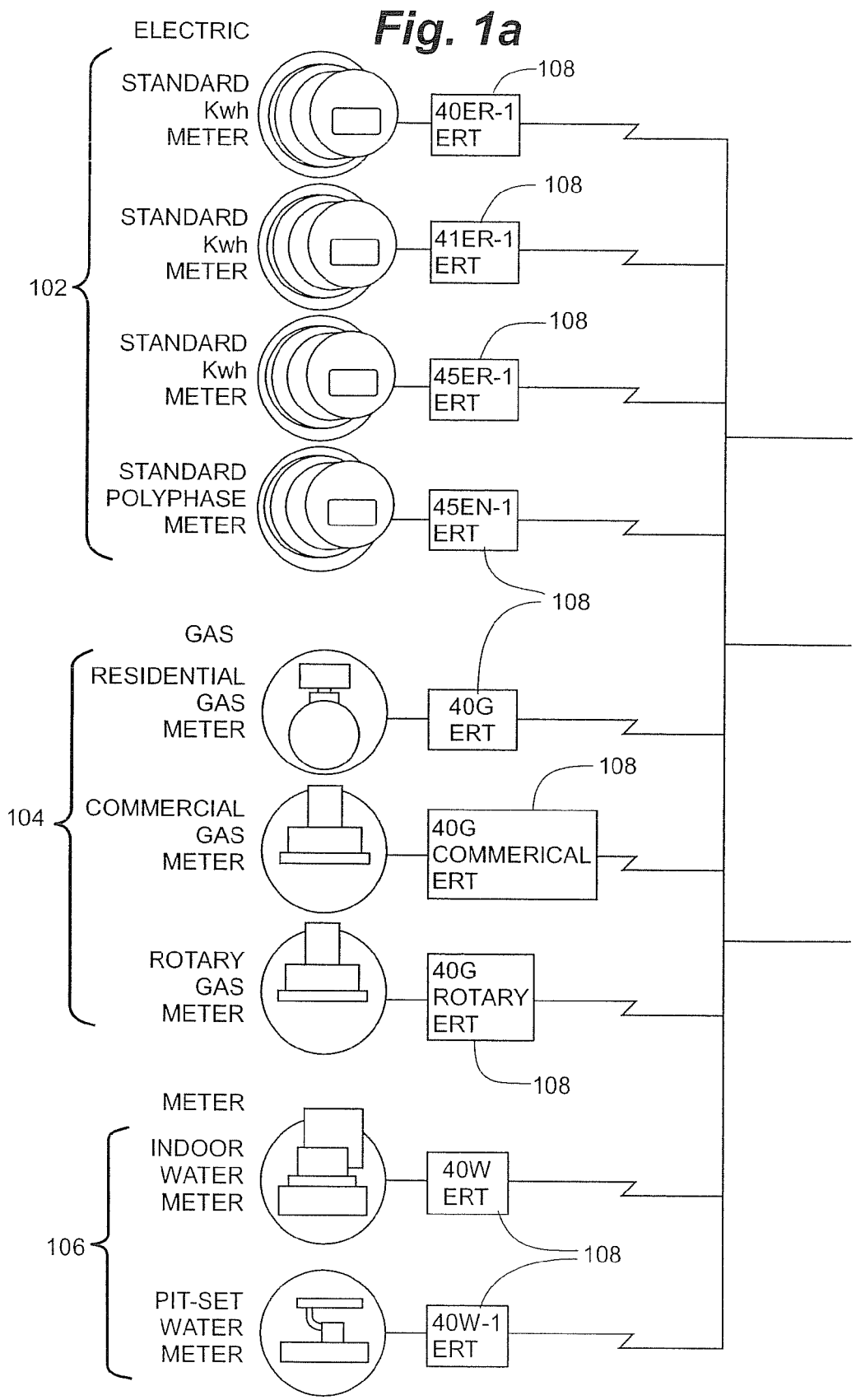
Figure 1B:
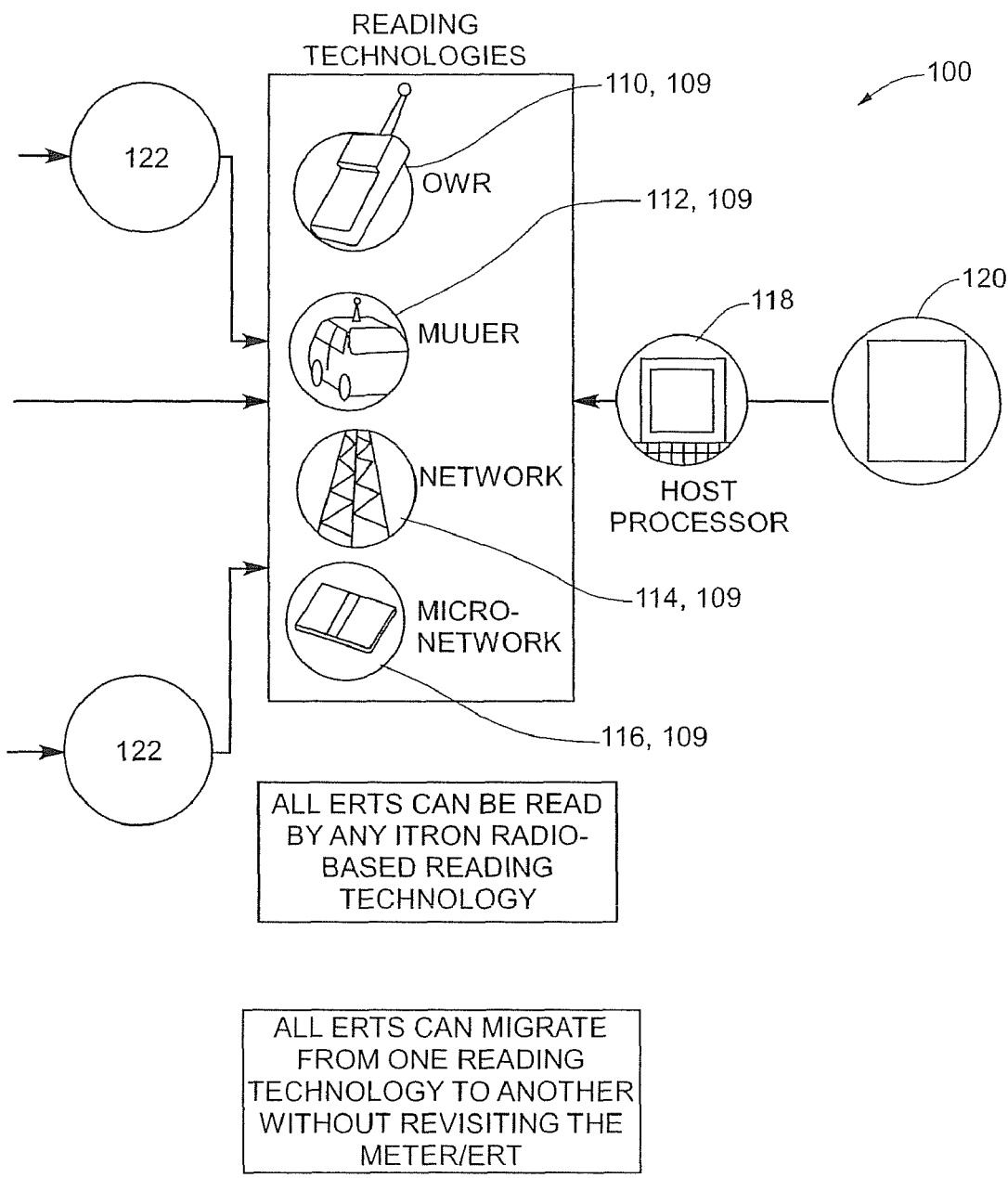

In an automatic meter reading system 100 of the present invention, as depicted in FIG. 1, the components generally include a plurality of telemetry devices including, but not limited to, electric meters 102, gas meters 104 and water meters 106. Each of the meters may be either electrically or battery powered. The system further includes a plurality of endpoints 108, wherein each corresponds and interfaces to a meter. Each of the endpoints 108 preferably incorporates a radio receiver/transmitter, e.g., the Itron, Inc. ERT. The system additionally includes one or more readers 109 that may be fixed or mobile, FIG. 1 depicts: (1) a mobile hand-held reader 110, such as that used in the Itron Off-site meter reading system; (2) a mobile vehicle-equipped reader 112, such as that used in the Itron Mobile AMR system; (3) a fixed radio communication network 114, such as the Itron Fixed Network AMR system that utilizes the additional components of cell central control units (CCUs) and network control nodes (NCNs); and (4) a fixed micro-network system, such as the Itron MicroNetwork AMR system that utilizes both radio communication through concentrators and telephone communications through PSTN. Of course other types of readers may be used without departing from the spirit or scope of the invention. Further included in AMR system 100 is a head-end, host processor 118. The host processor incorporates software that manages the collection of metering data and facilitates the transfer of that data to a utility or supplier billing system 120.

The automatic meter reading system 100 of the present invention is able to enable meter reading, two-way communication between devices, and the maintenance of battery life by the synchronization of the reader 109 to the endpoint 108, as opposed to the more common method of synchronizing the endpoint to the reader. In particular, each of the endpoints 109 wake up periodically and transmit a short burst of data consisting of a synchronization pattern, a preamble and the endpoint ID. The endpoint 108 then turns off its transmitter and listens for a response from the reader 109. After the response listen time, the endpoint sleeps until the next transmit time. This is essentially a bubble up system but all that is sent is the ID, this keeps the transmission time very short and conserves battery life. If a reader 109 is in the area and wishes to get data from the endpoint 108 it needs to transmit to it during the endpoint's listen period. At that point, the reader 109 can request more data and a data transfer session can take place, via two-way RF communication. Alternatively, the reader may not need to collect data and may simply log the existence of the endpoint.

In a bubble up system like this, the reader 109 is always on looking for endpoints 108 that are bubbling up. Typically receivers do not have battery limitations. The quiet period between transmissions from the endpoints 108 can be variable depending on the system requirements. The endpoints 108 preferably bubble up slower in a fixed network installation than in a mobile system. The bubble rate is preferably on the order of a few seconds. In a mobile system, the endpoints 108 preferably bubble up more often. The endpoints 108 are preferably programmed to bubble at a slow rate of one a minute until the read time of the month. Then, the endpoint 108 would bubble up faster for a few days or until it is read. At that time, the endpoint 108 would bubble slowly again. This keeps it available for unscheduled reads and, at the same time, conserves battery power.

A repeater 122 may be used in the system 100 and, if so, the repeater 122 preferably bubbles up to the main reader 109 just like an endpoint 108. Once the repeater 122 is acquired by the main reader 109, it is instructed to listen for a period of time to capture all of the endpoints 108 it can hear. The repeater 122 then sends the ID's for the endpoints 108 to the reader 109 and the reader 109 sorts which of the endpoints 108 the repeater 122 should track. The repeater 12 then synchronizes itself to those endpoints 108. When the reader 109 desires a reading, it passes a command to the repeater 122 to collect reads. The repeater 122 passes this command to the endpoints 108. Once all of the reads are collected, the repeater 122 passes them up to the reader 109.

In an alternative configuration, the reader 109 passes an ID list and a reading schedule to the repeater 122. When asked for end point reads, the repeater 122 sends the most recent reading. This method has the latency of the bubble time interval of the endpoint 108 plus the interval of the repeater 122; for daily reads this may not be a problem. Time latency may be as short as 20 seconds but this can impact battery life. If the number of endpoints 108 that the repeater 122 tracks is small the repeater 122 can be battery powered. The repeater 122 can then sleep when it is not required to get data from the endpoints 108. The repeater 122 can wake at predetermined intervals to bubble to the reader 109 and then listen for its endpoints 108. If a short latency is required, the repeater 122 is able synchronize to the endpoints 108 waking whenever an endpoint 108 is due to bubble. If latency is not an issue, the repeater 122 is able to turn on its receiver once an hour, for example, for a time duration long enough to read its endpoints 108, e.g., 20 seconds. The performance of the repeater 122 does not have to equal that the main reader 109 in terms of receiver sensitivity and transmit power. Rather, the repeater 122 can be used primarily as a hole filler but can be used as a range extender as well. A significant benefit of the repeater is that it is low cost, easy to place, and provides desirable battery operation.

A desirable feature of the system 100 of the present invention is that it synchronizes by adjusting the reader 109 to the endpoints 108. Historically, meter reading systems synchronize by having the reader transmit a wakeup tone. When the endpoints receive this tone they transmit data. In the system 100 described herein, the reader listens for endpoints 108 and synchronizes to them. In this system 100, the endpoint 108 transmission is short and preferably includes, a preamble, an ID, the frequency the endpoint receiver will be on next, and call back conditions (through call back conditions, the endpoint 108 can request that the reader 109 answer back due to an alarm condition at the endpoint 108).

If the endpoint 108 is on a meter, such as a gas meter, and all that is required are simple, once-a-day consumption reads, then the endpoint 108 transmission packet may also confirm the data and may bubble less often to conserve the battery. The packet is preferably followed by a CRC-check. Once the transmission packet is received by the reader 109, and if the reader 109 wants more information such as obtaining tamper data, or to perform various functions such as resetting a register, setting timing, or adjusting frequency, the reader 109 is able to carry on a two-way interchange by transmitting the request when the given endpoint 108 is listening.

Since there is more horsepower in the reader 109 it could determine if the endpoint 108 is drifting off frequency and then send frequency correction information back to the endpoint; of course data of various kinds could be requested as well without departing from the spirit or scope of the invention. Simple consumption reads or interval reads are two situations that would benefit from the use of two-way meter reading. For example, during the two-way communication intervals can be redefined if needed. And, if endpoint bubble up times are too closely spaced then the reader 109 can instruct the endpoint 108 to bubble at a different rate, or delay in the time the next bubble up and keep the same rate. The two-way format allows for flexibility and upgrading the system on line.

Example Implementation

The following describes a specific implementation of the RF Based Meter Reading System described in the paragraphs immediately above. In this embodiment, communication occurs in the 900 MHz ISM band. It could however be implemented at different frequencies without departing from the spirit or scope of the invention. On off keying (OOK) and frequency shift keying (FSK) are utilized.

In this system, a newly deployed endpoint 108 transmits a standard consumption message (SCM) with the same structure as today's SCM, e.g., 21 bit preamble field followed by 2 ID bits, 1 spare bit, 2 physical tamper bits, 4 endpoint type bits, 2 encoder tamper bits, 24 consumption data bits, 24 ID bits, 16 CRC checksum bits (this can also be found in U.S. Pat. No. 4,799,059, which describes the ERT packet in its FIG. 3, the '059 patent is hereby incorporated by reference). Immediately after transmitting an SCM the endpoint 108 goes into receive mode. The SCM that is transmitted is sent using on off keying (OOK). When the endpoint 108 goes into receive mode it is FM. The SCM is modified by appending the channel that the receiver will listen on. In addition, other information may be appended such as tamper flags requesting an immediate call back from the reader 109.

When the reader 109 receives the SCM, if it requires more information from the endpoint 108, it will carry on a two-way FM session with the module. The SCM will bubble up from the endpoint 108 on fixed intervals. It will also be transmitting at 1 mW to be compatible with the existing endpoints 108 already deployed and operating under FCC 15.249 rules. Since the SCM synchronizes the endpoint 108 to the reader 109, any two-way FM transmissions that follow preferably utilize higher power transmissions and operate under FCC 15.247 rules. If the SCM is transmitted at a controlled frequency, with little drift, then the receiver trying to read it can be a narrow band receiver. By using a narrow band receiver, the receiver sensitivity can by increased by over 5 dB, over existing reading devices that employ wideband receivers of around 250 kHz. The new endpoints would be backward compatible into existing Itron AMR systems.

In a preferred embodiment, new readers 109 employ a DSP radio enabling the receive bandwidth to be set by DSP firmware. This way a new system could read previously existing endpoints 108 with reduced sensitivity. The system at this level is preferably used primarily by a mobile meter reading system that utilizes readers such as hand readers and vans. The bubble rate is set to maximize battery life and ensures system performance. Since it is a two-way system, the reader 109 is able to tell the endpoint 108 to bubble at a much slower rate until the next read time. This saves battery life but still leaves the endpoint 108 available for reads.

As the deployment is required to move from a mobile meter reading system to a fixed network meter reading system, the endpoints 108 are preferably programmed to transmit the data at a much slower rate. In the fixed network situation, only the ID is preferably transmitted to reduce transmission time. If the data rate is reduced to 1200 baud about 10 dB of gain can be realized. Since the transmission time will be longer, the bubble rate can be reduced to maintain battery life. A system running in this mode is able to use fewer readers that are placed in the field. The two-way FM link can still be used, however, higher transmission power may be needed to match the AM performance in either mode (fast or slow data rate). If a channelized receiver is used it is possible to transmit the SCM at a higher power, e.g., +10 dBm, and comply with FCC 15.247 rules on the AM bubble up.

Further development of this system includes having the endpoint 108 operate under 15.247 rules FM two-way all the time. This system would be most appropriate for electrical meters that are line-powered. The electrical meters can transmit as often as they want and leave their receivers on to keep synchronization with a fixed network radio.

In order to get better coverage over a deployed metering system, a repeater 122 can be implemented. This repeater 122 is used mainly as a hole filler. The repeater 122 is not intended to have the same receiver sensitivity and, as a result, it can use lower cost and lower power components. It is possible to have the repeater 122 run off of lithium batteries at relatively low cost. The repeater 122 preferably bubbles up just like an endpoint. Once it is acquired by the reader 109, it is told to go into a listen mode to find all of the endpoints 108 in its area. The repeater 122 then transmits the IDs of the endpoints 108 it can hear to the reader. The reader 109 compares the list to the endpoints 108 that the reader 109 can hear. The reader 109 then instructs the repeater 122 to listen only to the endpoints 108 that the reader 109 cannot hear. The repeater 122 tracks the endpoints 108 by turning on its receiver at the time the endpoint 108 is due to bubble up.

In the case of monthly reads, the repeater 122 can stay asleep for most of the month and then turn on and acquire its endpoints 108 near the reading time. In general, if the reader 109 wants a reading from an endpoint 108 under a repeater 122, the reader 109 tells the repeater 122 on the two-way FM link. This happens after the repeater 122 bubbles up its ID. The repeater 122 then waits for the endpoint 108 to bubble up and either uses the SCM data or requests additional data. Once the data is obtained the repeater 122 sends it up to the reader 109. It may be sent as soon as it is acquired or it may synchronize with the next bubble up. To minimize the number of channels the repeater 122 or reader 109 look for the endpoint 108 on, a select number of channels can be used for bubbling up. These channels are preferably spread across the ISM band. This only works under 15.249 rules.

Quantitative Improvement

The quantitative improvement provided by the specific implementation described above can be better understood when described in contrast to the Itron meter reading technology of today. The Itron meter reading technology of today operates under FCC 15.249 rules. The endpoint 108 transmits at 1 mW output power and its receiver has a sensitivity of around −90 dBm. This receiver operates in the MAS band, which requires an FCC license. The readers 109 for this system generally fall into two categories: (1) A mobile reader such as a van that has a receiver sensitivity of −113 dBm and a wake-up transmitter output power of around +38 dBm; and (2) Other Readers, e.g., handhelds and fixed networks, having a receiver sensitivity of around −108 dBM and a wake-up transmitter power of +23 dBm and +30 dBm, respectively. The RF link in today's encoder/receiver/transmitter (ERT) system is:

Van to ERT=123 dB Reader to ERT=108 dB
ERT to Van=113 ERT to Reader=108 dB

There are no limitations on the receiver sensitivity due to the fact that that an ERT can drift in frequency.

The present invention, at a first level, addresses a mobile meter reading system. Specifically, the present invention provides backward compatibility and provides for future migration. The present invention operates to limit the amount of frequency drift from the endpoint 108 so that a receiver with a narrower bandwidth can be used. Using a frequency locked RF chip such as the Bluechip BCC918 and configuring it to transmit OOK at low power provides a frequency stable endpoint. This then enables the use of a narrowband receiver and increases receiver sensitivity. If the bandwidth is reduced from 256 kHz to 50 kHz then around a 7 dB sensitivity improvement can be realized. The frequency stable endpoint 108 preferably bubbles up an SCM transmission and removes the need for a wake-up transmitter. This transmission preferably has an output of 0 dBm and is compliant with FCC 15.249 rules just like the Itron ERT of today. If the endpoint 108 is deployed in an existing system an existing reader 109 can read it with the same performance as the existing system. If it is in a new deployment then a new reader can read it with a 7 dB improvement in the link. The new reader 109 can read existing ERTs as well. If a DSP channelized receiver is employed then the receiver can decode on a narrow channel for new endpoints 108 or it can average channels together to get the required bandwidth to read old endpoints 108. When reading old endpoints 108 the system performance is that of an old system, i.e., 7 dB less link than a new one. The RF link in the system of the present invention (for mobile systems) is:

ERT to reader=116 dBM (based on new CCU4 receiver sensitivity of −109 dBm)

The SCM that is transmitted is preferably modified to include information appended to the end of the message. This does not interfere with the ability of an old reader to decode the message and it does provide additional information for the mobile meter reading system. Additional information preferably includes a channel number for the reader 109 to call back on as well as priority flags that may indicate a power failure, for instance, requiring an immediate callback from the reader 109. When the endpoint 108 sends the SCM packet it sends a channel number that it will be listening on immediately after the SCM transmission. The endpoint 108 then goes into receive mode and listens on that channel for a short period of time, e.g., 5 to 10 milliseconds. The receipt of the SCM synchronizes the reader 109 to the endpoint 108 so the reader 109 knows when and where to locate the endpoint 108. If the reader 109 requires more information such as ID or response to a power fail it can initiate communications on the channel that the endpoint 108 will be listening on. The two-way communications between the reader and the endpoint are FM and at a higher power. Since both ends are synchronized the two-way communications can take place under the FCC 15.247 rules. Using the example of a bluechip RF part, the endpoint 108 has a receiver sensitivity of −105 dBm at 9600 baud (19.2 k Manchester encoded). The receivers transmit power is +10 dBm. If the reader 109 has a transmit power of +10 dBm and a receiver sensitivity of −105 dBm then it would match the performance of the AM SCM link. The RF FM two-way link in the system of the present invention (for mobile systems) is:

ERT to reader=115 dB
Reader to ERT=115 dB

The preferred SCM message format of the present invention is found below:

| Preamble | ID and Data | CRC | Next Channel |
| --- | --- | --- | --- |

At a second level, the system of the present invention is applicable to fixed meter reading networks. When the area is sufficiently saturated with endpoints that the customer wants to move to a fixed network solution, the endpoints already deployed in the mobile system are preferably set with a new personality. The system remains a bubble up system but it preferably bubbles up at a slower rate. The data rate is also reduced to 1200 or 2400 baud. In this mode, the endpoint 108 preferably bubbles up only its ID to reduce transmit time but there is merit in sending an SCM like packet when basic metering functions are all that are required. At the slower data rate a processing gain of about 10 dB can be realized at the receiver. This gives the receiver an effective sensitivity of about −126 dBm. A slower data rate is preferably used for the two-way exchange as well, improving the receiver sensitivity. Since this is the fixed network it is not going anywhere and additional time can be taken to transfer the data. By adding a better LNA to the reader receiver and cutting the data rate in half, a 5 dB gain in reader sensitivity on the FM link can be obtained. This then provides a −110 dBm FM receiver. The endpoint receiver gains around 3 dB in sensitivity from a slower data rate. The reader 109 preferably transmits at 18 dBm on the FM link. If a Bluechip ASIC is used, a power amplifier is preferably included to increase its output from 10 dBm to 16 dBm. This gives a balanced link for both the AM bubble up and the FM two-way links. The fixed network RF links of the present invention are as follows:

AM Endpoint to reader=126 dB
FM endpoint to reader=126 dB
FM reader to endpoint=126 dB The issue of holes in the reading area of a fixed network is of real concern. As such, a repeater 122 is preferably used to relay information from an endpoint 108 to the reader 109. The repeater 122 does not have the same performance as the main reader 109 because it is mounted closer to the endpoint 108 and is much lower in cost than the reader 109. Further, the repeater 122 is preferably battery-operated so that connecting to the mains is not a concern. The repeater 122 preferably uses an RSSI type decoder for decoding AM signals from an endpoint 108 and has a sensitivity of −106 dBm. The repeater 122 preferably bubbles up its ID just like an endpoint.

When a reader 109 acquires the repeater 122, the reader 109 has the repeater go into a listen mode to find all of the endpoints 108 under it. This leaves the repeater 122 receiver on for many tens of seconds while it locates the IDs of endpoints 108 bubbling up under it. The repeater 122 then sends the information up to the reader 109. The reader 109 will determine which of the endpoints 108 it cannot hear and instruct the reader 109 to listen to only those endpoints 108. In an alternative embodiment, this selection may happen further up the chain at the head end to arbitrate between system cells and determine which repeater 122 will get an endpoint. When it is time to read the endpoints 108 the reader instructs the repeater 122 to get a reading when the repeater 122 bubbles up its ID. The repeater 122 then collects the reading from the endpoints 108 and passes them up to the reader 109. This will cause latency in the system.

A way to reduce this latency is for the reader 109 to give the repeater 122 a reading schedule. The repeater 122 then performs the reading of its endpoint 108 on its own and sends them to the reader 109 during the next bubble up period. To conserve power, the repeater 122 synchronizes its receiver time to the anticipated transmit time of endpoints 108 in its domain; the repeater 122 sleeps in between reads. For the endpoints 108 and the repeaters 122, if the reading schedule is regular, e.g., daily reads, then the endpoints 108 are instructed to bubble up at a slower rate for 23 out of 24 hours. The endpoints 108 and repeaters 109 then increase their bubble rate as the read time gets near. Once the reading is obtained the endpoints 108 and repeater 122 bubble slow again. Bubbling at a slower rate still allows for unscheduled reads but it takes longer to get them.

Low Cost Mobile Daily Interval Meter Reading System

The mobile daily interval reading system of the present invention utilizes the concepts described above but further expands on the earlier discussion by applying additional techniques for collecting daily interval data. The above disclosure stands on its own without using it for interval data as this daily interval invention can stand on its own without applying the earlier disclosure. When they are combined into a system, however, they create a powerful meter reading tool.

The mobile daily interval reading system works as described herein_below. If an endpoint 108 is deigned to transmit at a higher power, e.g., +10 dBm, and the receiver has a sensitivity of −114 dBm, a one-mile range can be achieved in a mobile environment. If the endpoint 108 is a bubble-up endpoint 108 that transmits every ten seconds and the reader 109 travels at 30 miles per hour the reader 109 is in range for approximately 100 seconds. The endpoint 108 is preferably designed to transmit either in AM or FM and send a short message such as the Standard Consumption Message (SCM) that the Itron ERTs send today. It also preferably has an FM receiver with a sensitivity of around −109 dBm for low data rate messages. After the endpoint 108 transmits its consumption data it listens on the same channel it transmitted on. If this is used in an electric meter the endpoint 108 can leave its receiver on as long as it is not transmitting.

This system can be modified for battery-powered products but with limited performance. When the reader 109 hears the endpoint 108 it can take a measurement of the signal strength (RSSI) and determine if the endpoint 108 is in range or the channel is clear enough for subsequent transmissions. If the channel is not clear the reader 109 does not reply and the endpoint 108 retransmits ten seconds later on another channel. When the RSSI is strong enough, the reader 109 transmits a command to the endpoint 108 to send some number of intervals and on what channel or channels. The reader 109 transmits this request at +10 dBm, or could go to +20 dBM if needed. This complies with the 15.247 miles because the endpoint receiver would be tracking the transmitter of the reader 109. Actually, the transmitter of the reader 109 is tracking the endpoint receiver since the reply is on the same channel that the endpoint transmitted on.

It is possible for the endpoint to skip a pre-defined number of channels up or down from its last transmission just to keep the band randomized, but this is not required. The endpoint 108 can send data to the reader 109 at a higher data rate than the SCM transmission, e.g., 20 k bits per second. If the endpoint 108 is in an electric meter it can save 15 minute interval data in 2 bytes (16 bits) of memory. There are 96, 15 minute intervals in a 24 hour period. If the endpoint 108 transmits 35 days worth of intervals, that amounts to 3360 intervals, or 53,7690 bits. Allowing for some overhead, that number can be rounded to 60,000 bits. At 20,000 bits per seconds (BPS) the endpoint 108 can transmit 35 days of 15 minute interval data in 3 seconds. If the data rate is increased to 32,768 BPS the transmission time is 1.83 seconds for 35 days worth of data. A data rate of 32,768 BPS should cost about 3 dB in receiver sensitivity. However, with 110 seconds in range and only 1.83 seconds to send the data there is some sensitivity, and therefore range, to give up. The FCC rules for 15.247 specify that at the higher power a transmission can only last 0.4 seconds in a 10 second period on any one channel. The endpoint 108 preferably hops between channels to send all of the data. To send 35 days worth of data the endpoint 108 preferably hops over 5 to 6 channels depending on packet overhead. If a transmission is lost due to a hop to a noisy channel the endpoint 108 is preferably instructed to resend only that block on another channel.

Once all of the data is transmitted the endpoint 108 is instructed to reset any registers that need to be reset and then told to go to sleep for a specified period of time, e.g., 10 minutes, to keep the band clear of unneeded bubble-up transmissions. This system preferably has a limited number of commands to the endpoint 108 to keep the system simple. The commands preferably include:

Send X number of past intervals
Send block X on channel X
Reset registers, the endpoint may reply with an ACK
Send time of use (TOU) data
Sleep for X time Additional commands may be added without departing from the spirit or scope of the invention.

This system approach is possible because of the more than 16 MHz of bandwidth available in the ISM band. A alternative of the present system is to have the reader 109 tabulate all of the endpoints 108 that bubble in a 5 second interval. The endpoints 108 would leave their receivers on long enough to wait for the response. The reader 109 would then request data, from all of the endpoints 108 it heard, on frequencies spread through the ISM band. This approach would be more desirable because when the reader is transmitting it cannot receive. Using a DSP based multichannel receiver multiple transmissions can be received simultaneously. Not only can interval packets be received but the multichannel receiver can continue to listen for new candidates bubbling up. It can also read and decode legacy ERTs during this time By collecting 15 minute interval data for 35 days, a utility is allowed not only to do monthly reads but to obtain profiling data for distribution optimization as well. Move in, move out could be billed to the nearest 15 minute interval. The reading performance of this system is similar to, or better than that, of the mobile collector. It allows basic SCM type reads or higher functionality reads from the same installed base. If the reader does not want the additional data it does not request it.

The present invention may be embodied in other specific forms without departing from the spirit of the essential attributes thereof; therefore, the illustrated embodiments should be considered in all respects as illustrative and not restrictive, reference being made to the appended claims rather than to the foregoing description to indicate the scope of the invention.

What is claimed is:

1. An automatic meter reading system, comprising:
a reader; and
a plurality of utility meter endpoints, wherein each of said plurality of endpoints transmits a standard consumption message (SCM) via an AM transmission and wherein said endpoint immediately goes into a two-way, FM receive/transmit mode upon completing the transmission of said SCM, wherein upon said reader receiving said SCM and desiring additional information from said endpoint, said reader requests said information via a two-way, FM communication.

2. The system of claim 1, wherein said reader includes a narrow band receiver.

3. The system of claim 1, wherein said reader comprises a digital signal processing (DSP) radio, and wherein a receive bandwidth of said DSP radio is set by a DSP firmware.

4. The system of claim 1, wherein said reader directs a bubble rate of each of said plurality of utility meter endpoints.

5. The system of claim 4, wherein said reader directs said bubble rate to slow after said reader has read each of said plurality of endpoints.

6. The system of claim 1, further comprising a repeater, wherein said repeater provides intermediate communication between said reader and said plurality of endpoints, and wherein said repeater communicates both with AM and two-way, FM receive/transmit.

7. The system of claim 1, wherein said system comprises a fixed network system or a mobile system.

8. A method for transmitting data in a utility meter reading system having a reader and an endpoint, comprising the steps of:
transmitting a standard consumption message (SCM) via an AM transmission by said endpoint;
switching said endpoint into a two-way, FM receive/transmit mode upon transmitting said SCM;
receiving said SCM with said reader; and requesting additional information from said endpoint with said reader via two-way FM communication between said reader and endpoint.

9. The method of claim 8, wherein said reader includes a narrow band receiver.

10. The method of claim 8, wherein said reader comprises a digital signal processing (DSP) radio, and wherein a receive bandwidth of said DSP radio is set by a DSP firmware.

11. The method of claim 8, further comprising the step of directing the bubble rate of said endpoint with said reader via two-way FM communications.

12. The method of claim 11, wherein said step of directing comprises directing said bubble rate to slow after said reader has read said endpoint.

13. The method of claim 8, further comprising providing intermediary communication between said endpoint and said reader via a repeater, wherein said repeater communicates in both AM and FM.

* * * * *